United States Patent [19]

Zuchowski et al.

[11] Patent Number: 5,024,521

[45] Date of Patent: Jun. 18, 1991

[54] AUTOSTEREOSCOPIC PRESENTATION SYSTEM

[76] Inventors: Larry Zuchowski, 4706 Sepulveda #308, Sherman Oaks, Calif. 91403; Clyde I. Tichenor, 15524 Cohasset St., Van Nuys, Calif. 91406; Irwin Ginsburgh, Newhall, Calif. 91321

[21] Appl. No.: 615,266

[22] Filed: Nov. 19, 1990

[51] Int. Cl.⁵ .................................... G03B 21/32
[52] U.S. Cl. .................................. 352/86; 352/43
[58] Field of Search ......................... 352/43, 61, 86

[56] References Cited

U.S. PATENT DOCUMENTS

| | | | |
|---|---|---|---|
| 1,771,029 | 7/1930 | Burkhardt | 352/43 |
| 2,952,182 | 9/1960 | Marks et al. | 352/86 |
| 3,006,241 | 10/1961 | Marks et al. | 352/86 |
| 3,180,211 | 4/1965 | Armstrong | 352/86 |
| 4,501,230 | 3/1970 | Johnston | 352/86 |

*Primary Examiner*—Monroe H. Hayes
*Attorney, Agent, or Firm*—Albert O. Cota

[57] ABSTRACT

An autostereoscopic presentation system (10) that allows a perceived three-dimensional volumetric image (26) to be viewed without any viewing implements. The system (10), in its preferred embodiment, consists of an enhanced film strip (12) having first and second photographic frames (14), (18) where each frame consists of a two-dimensional optical image (16), (20) further having a conventional image (16a), (20a) and a matted image (16b), (20b). The film strip is back projected onto two stationary screens (30), (32) that are juxtaposed in planar separation and where each screen operates in either a translucent mode or a clear mode. A timing and synchronizing circuit (40) in combination with a pair of light responding circuits (48), (49) selects and controls the operational modes of the screens (30), (32) and synchronizes the screen operational modes with the respective alternating projection of the two-dimensional optical images (16), (20). By rapid alternate projections of the optical images onto the screens (30), (32) that are operating in their respective operational mode, the perceived three-dimensional image is produced.

26 Claims, 5 Drawing Sheets

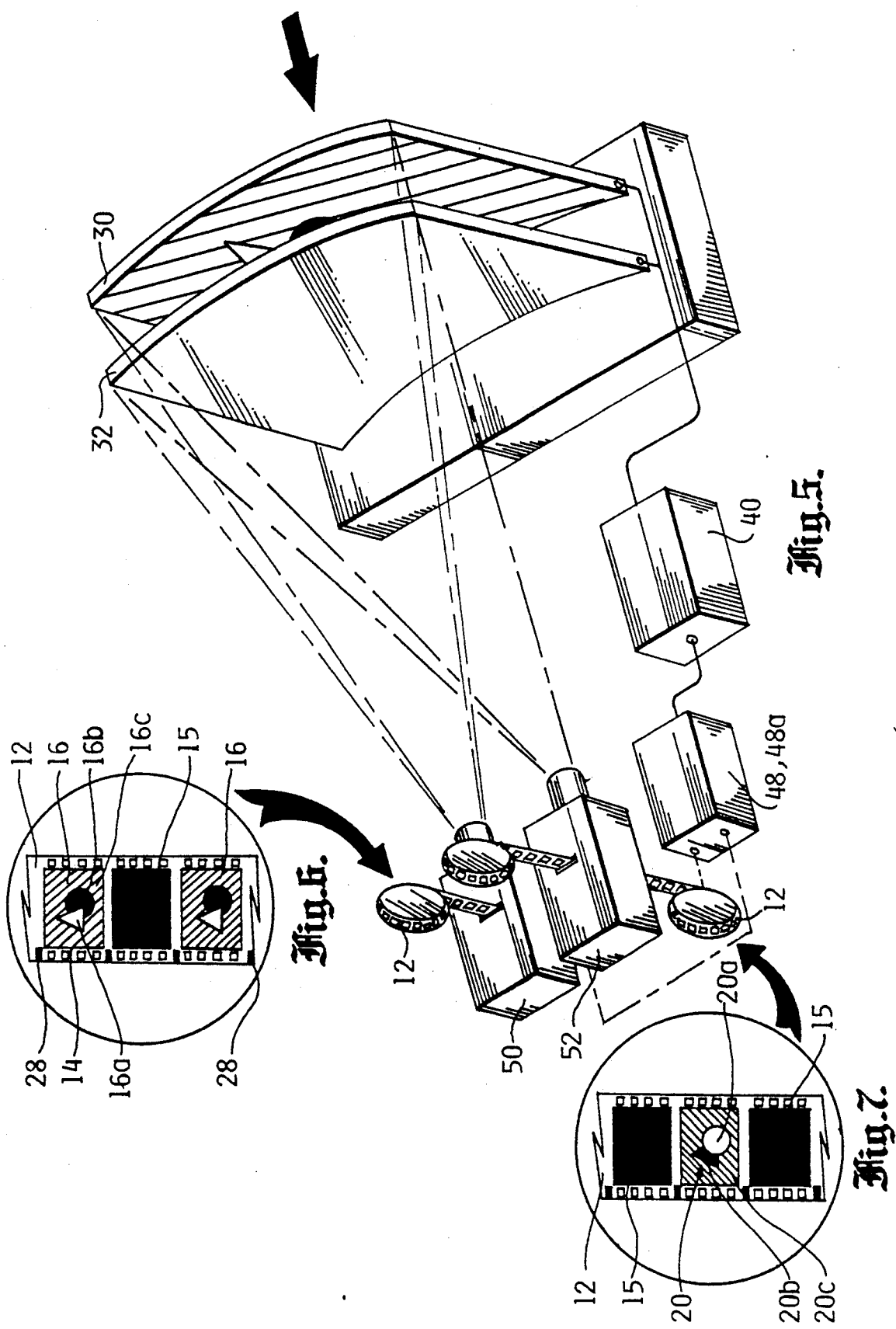

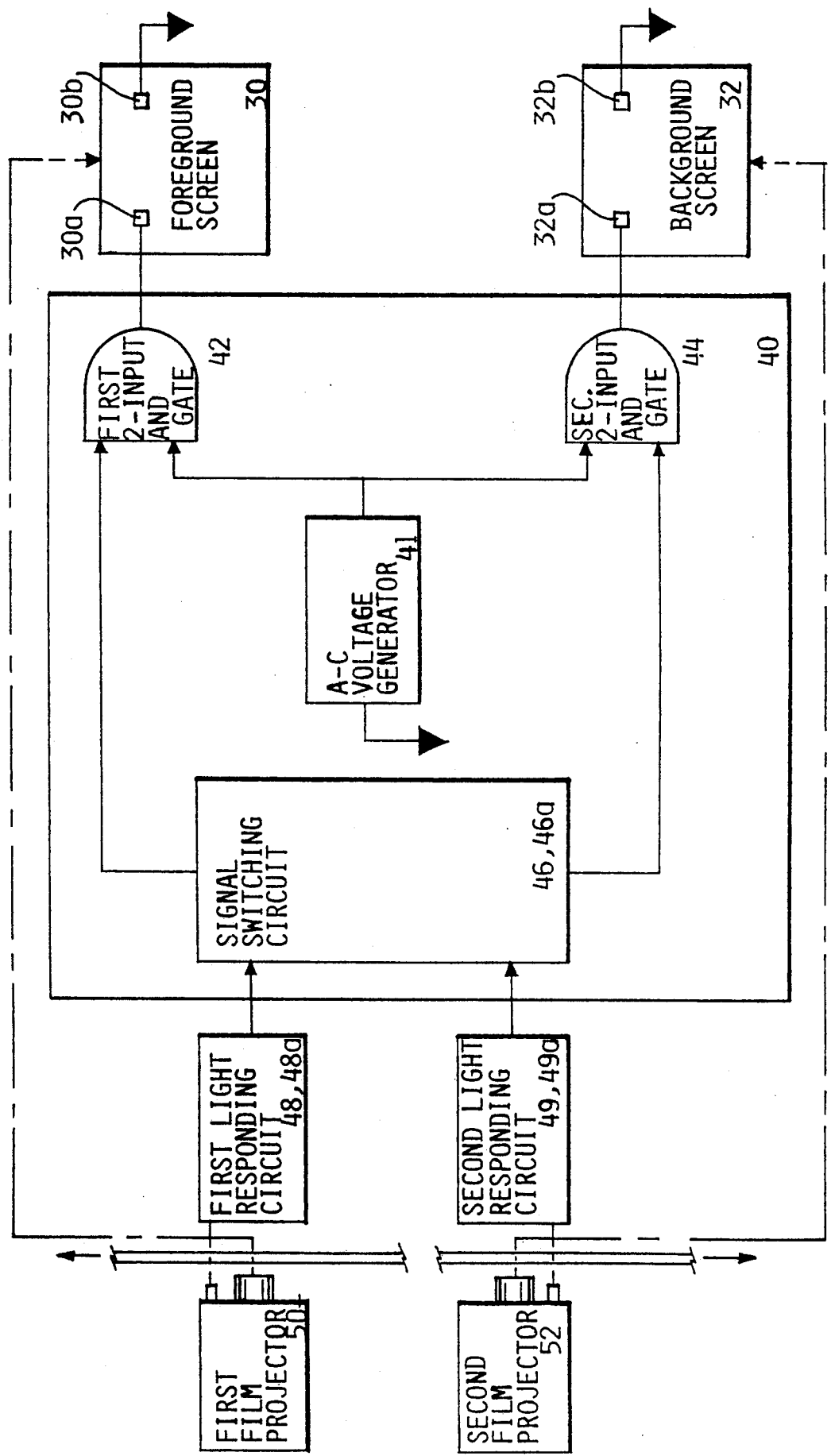

AUTOSTEREOSCOPIC PRESENTATION SYSTEM

TECHNICAL FIELD

The invention pertains to the general field of three-dimensional presentations and more particularly to an autostereoscopic presentation that utilizes a plurality of non-moving screens in combination with sychronized image projections to produce a perceived three-dimensional image.

BACKGROUND ART

The quest to produce quality and technically-effective three-dimensional images has continued for a number of years. Basically, there are two types of presentation methods or systems that are available for viewing three-dimensional images; these are broadly characterized as either stereoscopic or autostereoscopic.

In stereoscopic systems, pairs of ordinary two-dimensional still photographs or binocular motion pictures are made of an object from two points of view. The two points are separated by a distance equal to the distance between the eyes of a viewer. The pair of photographs or motion pictures are then viewed by a device that allows the right eye to see only the right image and the left eye only the left image. In this viewing system, each eye sees a slightly different image; thereby duplicating the conditions under which the original scene would have been viewed. Consequently, the viewer is aware of only one image that has a three-dimensional effect.

To view objects stereoscopically, the stereo photographs or moving pictures must be separated by an opaque area that allows the right eye to see only the right view and the left eye only the left view. several systems have been devised to permit stereoscopic viewing. For example, red and green tinted monochrome images are both displayed to be viewed by glasses having left and right lenses with corresponding red and green tints; or two color images are projected through mutually perpendicular polarized filters and are then viewed through glasses that are polarized in the same manner.

In autostereoscopic systems, it is not necessary for the viewer to wear special glasses or to use any other viewing implement to keep the two images separated. What the viewer sees is not the pair of two dimensional images as described above, but rather a set of images that either appear to be distributed over three dimensions or are actually distributed over three dimensions. A holographic image is an example of the first type of autostereoscopic imaging. The second type of autosteroescopic imaging is currently achieved by the use of moving screens or vibrating varifocal mirrors that are vibrated by an oscillating frequency that causes the mirror to have a continuously variable focal length. In both types, the image is constantly moved back and forth in the image space provided. This movement causes the images to fuse together and because of the persistence of the eyes a three-dimensional image is perceived.

A search of the prior art did not disclose any patents that read directly on the claims of the instant invention however, the following U.S. patents were considered related:

| U.S. PAT. NO. | INVENTOR | ISSUED |
| --- | --- | --- |
| 4,747,665 | O'Brien | 31 May 1988 |
| 4,714,319 | Zeevi et al | 22 December 1987 |
| 4,571,041 | Gaudyn | 18 February 1986 |
| 3,248,165 | Mark et al | 26 April 1966 |

The O'Brien patent discloses a method for displaying three-dimensional images. The method consists of driving a flexible membrane mirror by a composite waveform that consists of triangle and sinusoidal waves. The composite waveform displaces the flexible membrane mirror so that the mirror's surface is alternatively convex and concave. The driving waveforms are then synchronized to display an alternating sequence of two-dimensional images on a CRT screen such that the viewer perceives a three-dimensional image.

The Zeevi et al patent discloses a method of generating disparate information for imparting depth perception to an image. The depth perception is created by projecting an image of an object using a plurality of energy sources to create a plurality of images having different shadows. A single detector, such as a camera, detects and successively records the object with the object illuminated for successive frames from light sources at spaced apart locations. When viewed, the image will have a three-dimensional effect that in substance, is a shadowgram having an illusion of depth.

The Gaudyn patent discloses a three-dimensional projection arrangement for projecting dual three-dimensional images of objects into space for viewing by an unaided audience. The objects are illuminated by a source of light, and the light rays reflected from the objects are directed so as to be incident on a mirror surface located behind a lens and the combination forms the enlarged three-dimensional images that are projected into space. The lens can be in the form of a modified fresnel lens that provides a substantially large field of view.

The Marks et al patent discloses a moving screen projection system that simulates a three-dimensional presentation. The system includes plural projectors that are combined with at least two viewing screen spaced from each other. The multiple screen system includes (1) a foreground reflecting surface having holes for passing some of the projected light, (2) a polarizing film on the screen which passes only light polarized in a first plane, and (3) a diffusing layer that diffuses the reflections of the incident light. A background screen is mounted behind the foreground screen for receiving and reflecting light passed through the holes.

DISCLOSURE OF THE INVENTION

The autostereoscopic presentation system utilizes a computer enhanced film strip having a multiplicity of photographic frames. Each frame has a two-dimensional optical image where the optical image of the first frame has a foreground of a scene that appears as a conventional image, that is an image as normally seen, and a background that appears as a black or matted image hereinafter matted image. The succeeding second frame has an optical image that has a background of the same scene that now appears as a conventional image with a foreground that appears as a matted image. The remaining and succeeding frame pairs rapidly alternate their optical images as described above with appropriate movement of the optical images in the case of motion pictures.

A projector is used that provides the means for projecting the enhanced film strip onto at least two stationary screens that operate in either a translucent mode or a clear mode and that are juxtaposed in planar separation from each other. The screen nearest the viewer is referred to as the foreground screen while the remaining screen(s) are referred to as the background screen(s). The system basically functions because of the persistance of vision. In other words, the eyes will retain the first projected image while the second image is being projected. Thus, their is a fusion of images that result in a single perceived three-dimensional image. Additionally, by alternately projecting two images there is an effective overlay of images which results in a high-definition picture. To avoid flicker, the foreground and background images are each projected at a rate of at least 96 times per second.

To operate the system, a means is provided for selecting and controlling the operational modes of the screens, and for synchronizing the operational modes of the screens with the respective alternating projections of the two-dimensional optical images. At any one time period, only one conventional image is projected onto the specific screen that is operating in its translucent mode. For example, in a back projected design when the background screen is in its clear mode, the foreground image is synchronously projected through the clear background screen and onto the translucent foreground screen. Conversely, when the foreground screen is in its clear mode, the background image is synchronously projected into the translucent background screen. In this instant, the background screen is viewed through the clear foreground screen.

In view of the above disclosure, it is the primary object of the invention to provide an autostereoscopic presentation system that functions by alternately projecting optical images onto stationary screens that operate in synchronously selected operational modes. Thus, the system allows a viewer to perceive a three-dimensional volumetric image without the need for a viewing implement. In addition to the primary object, it is also an object of the invention to have a system that:

can be used as a conventional film projection system of
  that can be modified to allow a television transmitter to braodcast special film that would be received by a television receiver,
operates with stationary screens,
is reliable and easily maintained,
can function with either color or black and white positive transparencies,
is preferably but not limited to back projection;
can utilize currently available computer enhancement techniques to prepare the film strip or slides required by the system,
can be made with screens of various sizes, and
can be used for three-dimensional display advertising.

BRIEF DESCRIPTION OF THE DRAWINGS

FIG. 5 is a perspective view of an autostereoscopic presentation system consisting of two projectors and two screens, FIG. 6 depicts the configuration of a first film strip that would be used with one of the projectors as shown in FIG. 5.

FIG. 7 depicts a configuration of a second film strip that would be synchronized with the first film strip of FIG. 5 and projected through a second projector.

FIG. 12 is a block diagram of the system showing the timing and synchronizing circuit connected to two screens.

BEST MODE FOR CARRYING OUT THE INVENTION

Figures 1, 2:
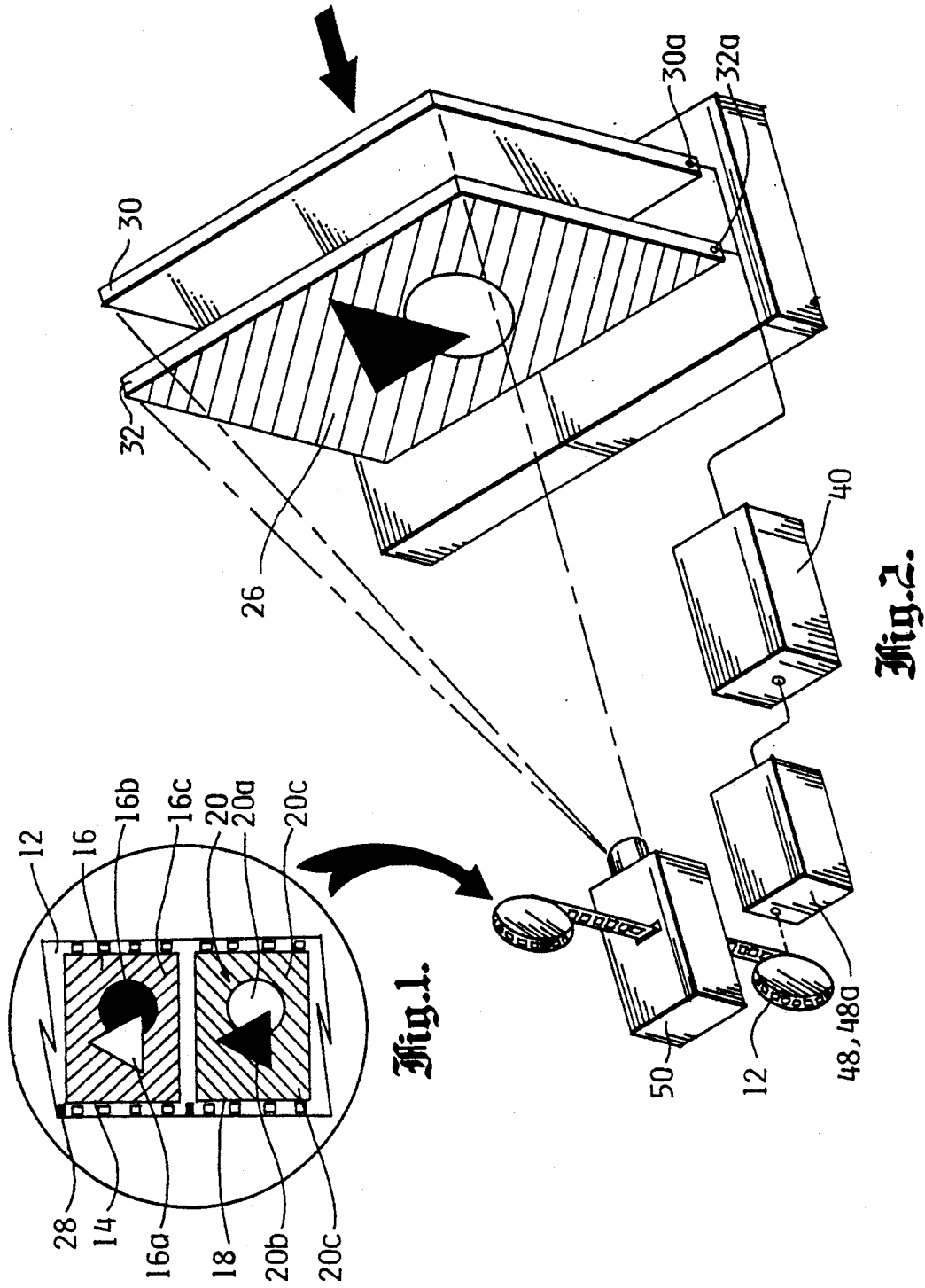
FIG. 1 depicts a film strip segment having a first and second photographic frame.
FIG. 2 is a perspective view of an autostereoscopic presentation system consisting of a single projector and two screens.

The best mode for carrying out the autostereoscopic presentation system 10 is presented in terms of a preferred embodiment that is primarily designed to provide separate foreground and background two-dimensional images to a viewing audience who then perceive a three-dimensional volumetric image that is viewed without any viewing implements.

The preferred embodiment, as shown in FIGS. 1 through 12 is comprised of the following major elements: an enhanced film strap 12 having a multiplicity of sequential photographic frames, a stationary foreground screen 30, a stationary background screen 32, a timing and synchronizing circuit 40, a light responding circuit 48 and a conventional projector 50.

In describing the preferred embodiment, the multiplicity of photographic frames is limited to a first photographic frame 14 and a second photographic frame 18 as shown in FIGS. 1A and 1B. The first frame 14 includes a first two-dimensional optical image 16 having a foreground that appears as a conventional image 16a and related background that appears as a matted image 16b and 16c. The matted image 16c in actuality would also be matted and would be indistinguishable from the image 16b. However, for visual clarity and explanatory purposes, the image 16c is shown with cross-hatching. The following second photographic frame 18 consists of a second two-dimensional optical image 20 having reversed images, that is, the related background now appears as a conventional image 20a and the foreground appears as a matted image 20b and 20c. As described above, for visual clarity, the image 20c is shown with cross-hatching. The optical images may be positive color transparencies or positive black and white transparencies.

Figure 3A:
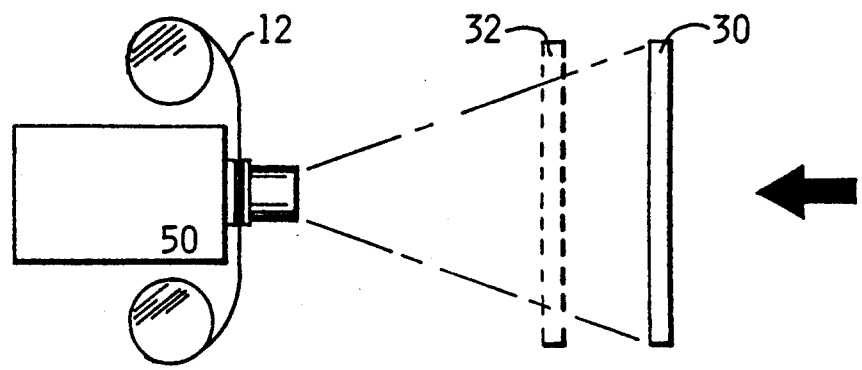
FIG. 3A depicts a single projector projecting a two-dimensional foreground image onto a translucent foreground screen through a clear background screen.
Figure 3B:
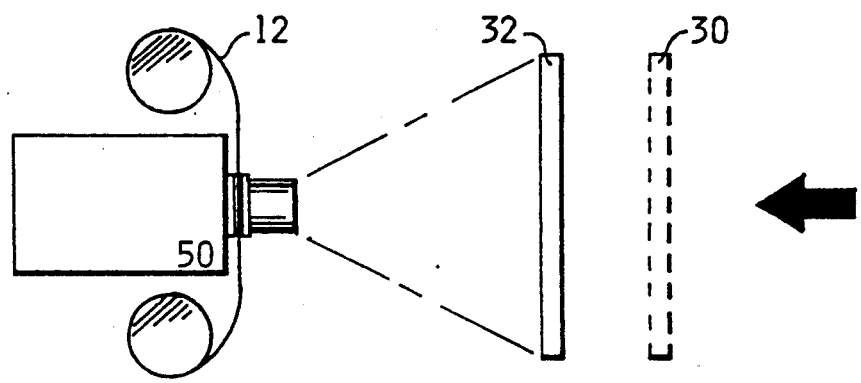
FIG. 3B depicts the single projector projecting the two dimensional background image onto a translucent background screen as viewed through a clear foreground screen.

The film format of the preferred embodiment is operated through the single double speed projector 50 that back projects the optical image 16, 18 onto a plurality of stationary screens. The screens are juxtapositioned and located in planar separation from each other and each screen operates in either a clear mode or a translucent mode. In it simplest design configuration, the system 10, as shown in FIGS. 2, 3A and 3B, operates with two screens where the screen nearest the viewer is considered the foreground screen 30 and the screen nearest the projector 50 is the background screen 32. The projector 50 operates in cobination with the timing and synchronizing circuit 40, as shown in FIGS. 2, 5 and 12, that provides the means for synchronizing the projection of the optical images with the appropriate operational mode of the two screens. The circuit 40 is described infra.

Figure 4:
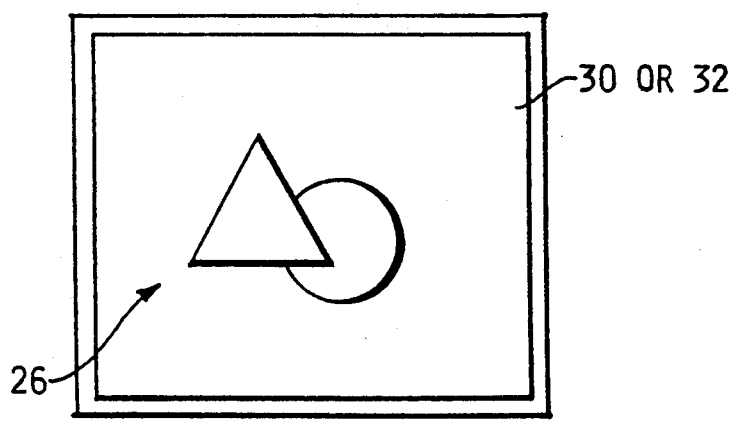
FIG. 4 depicts the resultant three-dimensional volumetric image that is perceived by a viewer because of the separation of the images.

For purposes of explanation, recall that the first optical images 16, as shown in FIG. 1A, has a foreground that is processed as a conventional image 16a and a background image as a matted image 16b; and conversely, as shown in FIG. 1B, the second optical image 20 has a background in a conventional image 20a and a foreground in a matted finish 20b. To commence the viewing sequence, as best depicted in FIGS. 3A and 3B, the foreground image 16a is back projected through the background screen 32, which has been set to its clear mode, onto the translucent foreground screen 30. The second optical image 18 is then projected onto the translucent background screen 32 and is viewed through the foreground screen 30 which has been set to the clear mode. By alternating the two optical images in synchronization with the respective operational mode of the two separate screens, the viewer is able to perceive, as shown in FIG. 4, a three-dimensional volumetric image without the need for a viewing implement. The reason a three-dimensional image is perceived is due to the persistence of vision. This persistence allows the eyes to retain the first projected image while the second image is being projected. Therefore, there is a fusion of the two images which results in the perceived three-dimensional image. Also, by alternately projecting two images, there is an effective overlay to the images which results in a high-gain, high-definition image.

The above description, is applicable to a single film strip that is used with a single projector 50 as shown in FIG. 2. If two conventional but synchronized projectors are used, as shown in FIG. 5, two film strips 12 would be required to project the optical images onto the foreground and background screens. In this two-film strip configuration, the first film strip 12, as shown in FIG. 6, would have a first photographic frame 14 that depict a first two-dimensional optical image 16 having a conventional foreground image 16a and a matted background image 16b.

This film strip would be projected by the first projector 50, as shown in FIG. 5, onto the translucent foreground screen 30 through the clear background screen 32. At the same time the first frame 14 is being projected, the corresponding first frame 15 on the second film strip, as shown in FIG. 7, would be a totally matted frame, therefore, no image would be projected. At the next frame pair, the first film strip 12 would have a second frame 15 that is totally matted and the second frame on the second film strip 12 would have a second two dimensional optical image 20 that conversely depicts a conventional background image 20a and a matted foreground image 20b. This second image would be synchronized with the screen 30, 32 so that the image is projected onto the translucent background screen 32 and viewed through the foreground screen which has been switched to its clear mode. The subsequent projections would continue as shown in FIGS. 6 and 7. The above technique also produces the three-dimensional volumetric image, as shown in FIG. 4, without the need for a viewing implement.

A film strip having a multiplicity of sequential photographic frames is preferred for viewing on the system 10. However, the system will also function with still slide transparencies. In this case, the perceived three dimensional volumetric image 26 would be derived from a first two-dimensional optical slide image 16 and a second two-dimensional optical slide image 20 as described above. The two slide transparencies would be operated by a slide projector (not shown) having means for alternately moving and synchronously projecting each slide transparency onto the foreground screen 30 and background screen 32 in synchronization with the respective operational modes of the screens.

The film strip 12 or still slides are prepared by a computer enhancement technique that is well known in the art and therefore is not described in detail. Generally, the computer enhancement apparatus takes each optical image of each existing frame and separates it into two frames. The first frame is then enhanced by taking the two-dimensional optical image and separating the foreground into a conventional and the background into a matted image. Likewise, the optical image on the second frame is separated into a conventional background image and a matted foreground image. In lieu of using computer enhanced film, the object to be viewed could be filmed by using two cameras. In this procedure, the first camera would film the conventional foreground while the second camera would film a prepared matted background. To film the second frame, the first camera would film a prepared matted foreground while the second would film a conventional background.

The stationary foreground screen 30 and the stationary background screen 32 are each liquid crystal screens that are constructed by a well known process that includes providing a liquid crystal coating with conductive surfaces between sheets of plastic. Each screen thereby has an electrical conductive path that terminates on the foreground screen 30 at a first electrodes 30a and a second electrode 30b and on the background screen 32 at a first electrode 32a and a second electrode 32b. When no power is applied to the electrodes, the liquid crystals are arrayed in curvilinear paths along the spherical walls of light-switching cells. In this arrangement, the liquid crystals are positioned to diffract or scatter incoming light to place the screen in its translucent mode. When power is applied to the electrodes, the resultant electric filed rotates the liquid crystals within the light-switching cells, aligning them with the electric fields and their light-propagation axis. When this condition exists, the screens are in their clear mode allowing light to pass.

The screens 30, 32 are switched to their clear mode when an interruptable voltage is applied to their respective electrodes. The interruptable voltage preferably consists of an a-c voltage that may vary between 55 and 120 volts. At 55 volts a-c the screen starts to charge from its translucent mode to its clear mode and at 90 volts a-c the screen provides maximum clarity.

Figure 8:
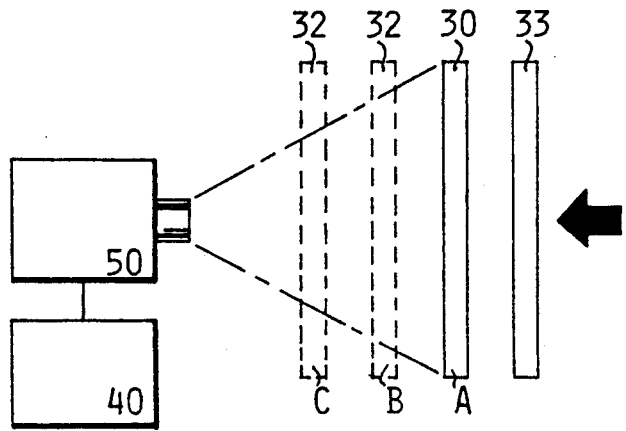
FIG. 8 is a side view showing the use of three screens and a fresnel lens located in front of the foreground screen.

The screen 30,32 may be configured to be substantially flat, as shown in FIG. 2; or in some situations screens that are slightly curved around the center vertical axis, as shown in FIG. 5, may be employed. The screens configuration as well as the square viewing area and their planar separation is dependent upon the distance the viewer is situated from the foreground screen 30 and the limiting viewing angle of the screens. To widen the viewing angle, a negative, cylindrical fresnel lens 33 may be located in front of the foreground screen 30 as shown in FIG. 8. In addition, the boundary between the image and the matte on the film should not be sharp, but should fade away and slight distance into the matte.

Figure 9:
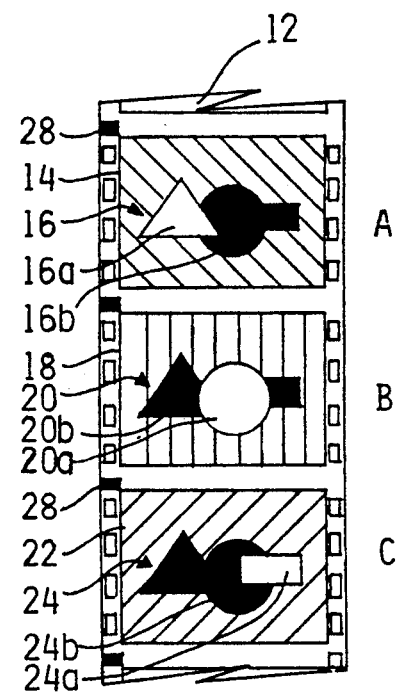
FIG. 9 depicts an example of a multiple film strip, in this case a three film strip, that would be used with the three screens as shown in FIG. 8. The frames would show foreground, middle ground and background images.

To provide increased resolution for the perceived three-dimensional presentation, three or more screens may be employed as also shown in FIG. 8 with three screens. In this design scheme the screens function as previously described with the exception that a film strip having a first second and third two-dimensional optical image 16, 10 and 24 would be required as shown in FIG. 9. The middle optical image, in this case, would contain a middle ground image. Additionally, when three or more screens are employed, any of the screens can be selected to be the background screen. The remaining screens, located towards the viewer, would then be synchronously set to provide either descending or ascending degrees of the foreground image. For example, as shown in FIG. 8, if screen C is the background screen, then screens B or A could be sequentially placed in their translucent mode and the synchronized foreground image would be back projected as shown. As with the other viewing schemes, the triple film strip and triple screens provide a perceived three-dimensional volumetric presentation.

Figure 10:
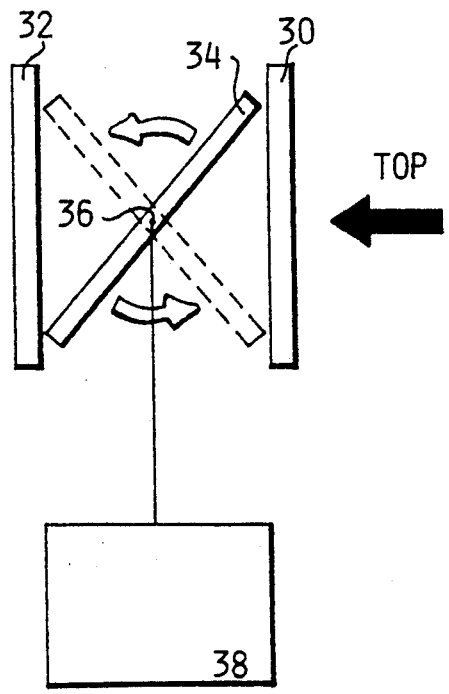
FIG. 10 is a top view of a movable screen that is located between the foreground and background screens and that rotates horizontally.
Figure 11:
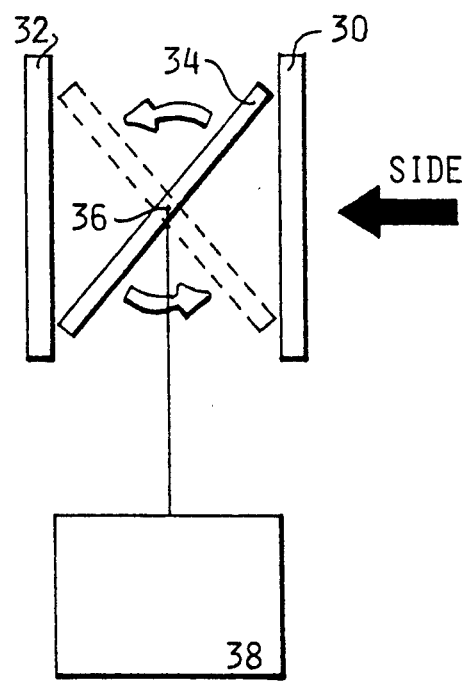
FIG. 11 is a side view of a movable screen that is located between the foreground and background screens and that rotates vertically.

A further viewing refinement may be achieved by including a movable screen 34 that is located between the foreground screen 30 and the background screen 32. Two movable screen designs are disclosed one that rotates horizontally about a pivot point 36 as shown in FIG. 10 and another that moves vertically about a pivot point 35 as shown in FIG. 11. To utilize these screens, a mechanism 38 having the means to focus the screen as the screen is being moved is required. The mechanism would also have the means to operate in combination with the electronics synchronizing circuit 40 to control the clear and translucent mode of the screen 34. By utilizing the movable screen 34 an object, such as a walking person, can be dimensionally viewed in incremental horizontal or vertical movements. Thus, a refined three-dimensional perceived image can be viewed.

The means for selecting and controlling the operational modes of the foreground screen 30 and the background screen 32 and for synchronizing the operational modes of the screens 30,32 with the alternating projections of the first and second two dimensional optical images 16,20 is provided by the timing and synchronizing circuit 40.

The circuit 40 as shown in FIG. 12 consists of an interruptable a-c voltage generator 41, a first two-input AND gate 42, a second two-input AND gate 44, and a signal switching circuit 46. The circuit 46 functions in combination with a first and second light responding circuit 48,49 that are optically connected to the first and second film projectors 50,52 respectfully. The projectors operate with the film strips 12 that each further include a timing segment 28 located on the side of the film strip and at the beginning of each photographic frame.

The first and second light responding circuits 48,49 each include a light emitter/detector circuit that in the preferred embodiment consists respectfully of a infrared emitter 48a, 49a. These circuits include further circuit means for producing a first and second timing pulse respectfully each time one of the timing segments 28 on the respective film strip 12 interrupts the infrared beam and this is detected by the infrared emitter circuit.

The signal switching circuit 46 has the means for detecting the first and second timing pulses from the first and second light responding circuits 48,49. The detection, in the preferred embodiment is provided by an infrared detector 46a located in the circuit 46. When the timing and synchronizing circuit 40 detects a timing pulse, it produces a first or second timing signal that is synchronously applied as the enabling input to either the first or second two-input AND gate 42,44. The output of the first AND gate 42 is a first screen power signal that is connected to the first electrode 30a of the foreground screen 30. A second screen power signal from the second AND gate 44 is connected to the second electrode 32a of the background screen 32. The second electrode 30b, 32b on each screen is connected to ground to complete the electrical path to the a-c voltage generator 41.

When the first AND gate 42 is enabled, the first screen power signal causes the foreground screen 30 to be placed in its clear mode while at the same time no signal is applied to the second AND gate 44 and therefore the gate remains disabled allowing the second screen 32 to remain in its normal translucent mode. Under these conditions, the conventional background image is projected onto the translucent background screen and is viewed through the clear foreground screen 30. Conversely, when the second AND gate is enabled the second screen power signal causes the background screen 32 to be placed in its clear mode while the foreground screen 30 is returned to its translucent mode. Under these conditions, the conventional foreground image is allowed to be projected through the clear background screen 32 onto the translucent foreground screen 30. Thus, by alternating the operational modes of each screen and allowing the separated foreground and background optical images to be alternately viewed, the viewer perceives a three-dimensional volumetric image that can be viewed without any viewing implements.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the claims.

We claim:

1. An autostereoscopic presentation system comprising:
    (a) An enhanced film strip having a multiplicity of photographic frames with each frame having a two-dimensional optical image, with the optical image of the first frame having a foreground appearing as a conventional image and the background appearing as a matted image, and where the second frame has an optical image having the background appearing as a conventional image and the foreground as a matted image, and where successive frames alternate as described above, (b) at least two stationary screens juxtaposed in planar separation from each other, where each said screen operates in either a translucent mode or a clear mode, (c) a projector having means for projecting the enhanced film strip onto said screens, at a rate of at least 96 images per second, (d) means for selecting and controlling the operational modes of said screens, where at any one time period, only one of said screens is in its translucent mode, (e) means for synchronizing the operational modes of said screens with the respective alternating projections of the two-dimensional optical images where at any one time period, only one conventional image is projected onto the specific said screen that is operating in its translucent mode, where the conventional image is viewed on said translucent screen through said screens which are operating in their clear mode, or projected through a clear screen to a translucent screen, thus be alternately projecting the optical images onto said screens operating in their respective operational mode the viewer is able to perceive a three-dimensional volumetric image without the need for a viewing implement, where the perceived image is due to the persistence of vision that allows the eyes to retain the first projected image while the second image is being projected to thus cause a fusion of the two images which results in the perceived three-dimensional image.

2. An autostereoscopic presentation system comprising:

(a) an enhanced film strip comprising:

(1) a first photograhic frame consisting of a first two-dimensional optical image having a foreground that appears as a conventional image and a related background that appears as a matted image, where the boundary between the images fade away into the matte, (2) a second photographic frame consisting of a second two-dimensional optical image having the related background appearing as a conventional image and the foreground appearing as a matted image, where the boundary between the images fade away into the matte, (b) a stationary foreground screen located nearest a viewer and that operates in either a clear mode or a translucent mode, (c) a stationary background screen juxtaposed behind and in planar separation from said foreground screen and that also operates in either a clear mode or a translucent mode, (d) a projector having means for synchronously back projecting said enhanced film strip onto said screens, (e) means for selecting and controlling the operational modes of said foreground and background screens, where at any one film projection time period only one of said screens is in its translucent mode while the other said screen is in its clear mode, and (f) means for synchronizing the operational modes of said screens with the alternating projections of said first and second two-dimensional optical images where when said foreground screen is in its clear mode, the background image is synchronously projected onto the translucent said background screen and viewed through the clear foreground screen and conversely, when said background screen is in its clear mode, the foreground image is synchronously projected through the clear background screen and onto the translucent foreground screen thus, by alternating the separated said optical images, the viewer is able to perceive a three-dimensional volumetric image without the need for a viewing implement.

3. The system as specified in claim 2 wherein said first and second two-dimensional optical images and developed as either positive color transparencies or black and white transparencies.

4. The system as specified in claim 3 wherein said positive color transparencies are still slide transparencies that are viewed through a slide projector having means to alternately move and synchronously project each said slide transparency onto the respective foreground screen and background screen.

5. The system as specified in claim 3 wherein said positive color transparencies are in the form of a film strip having a multiplicity of sequential photographic frames.

6. The system as specified in claim 2 wherein the planar separation of said screen is dependent upon the square viewing area of said screens and the distance the viewer is from said foreground screen.

7. The system as specified in claim 2 wherein said first and second screens comprise liquid crystal screens having a liquid crystal coating with conductive surfaces between sheets of a conductive plastic.

8. The system as specified in claim 7 wherein said liquid crystal screens further comprise an electrical path that terminates at a connector having a first electrodes and a second electrode.

9. The system as specified in claim 8 wherein said means for controlling the operational modes of said foregoing and background screens is accomplished by applying an interruptable voltage across the two screen electrodes.

10. The system as specified in claim 9 wherein said interruptable voltage consists of an a-c voltage that may vary between 55 and 120 volts where at 55 volts a-c the screen starts to change modes from its translucent mode to its clear mode and at 90 volts a-c the screen provides maximum clarity.

11. The system as specified in claim 3 wherein said first and second screens are substantially flat.

12. The system as specified in claim 2 wherein said first and second screens are curved around a vertical axis.

13. The system as specified in claim 2 further comprising a negative, cylindrical fresnel lens that is located in front of said foreground screen where said lens allows a wider viewing angle.

14. The system as specified in claim 2 wherein said first and second two-dimensional optical images are rear projected.

15. The system as specified in claim 2 wherein said means for selecting and controlling the operational modes of said foreground and background screens and for synchronizing the operational modes with the alternating projections of said first and second two-dimensional optical images is provided by a timing and synchronizing circuit comprising:

(a) an interruptable a-c voltage generator, (b) a first two-intput AND gate that is applied its first input form said a-c voltage generator, (c) a second two-input AND gate that is also applied its first input from said a-c voltage generator, (d) a first and second film projector where each said projector projects a respective film strip having a timing segment at the beginning of each said photographic frame, (e) a first and second light responding circuit having circuit means for producing a first and second timing pulse respectfully each time one of the timing segments on the respective said film strip interrupts the light and is detected by said first or second light responding circuits, (f) a signal switching circuit having the means for detecting said first or second timing pulse from said first or second light responding circuits whereupon the detection said signal switching circuit produces a first or second timing signal that is synchronously applied as the enabling input to either said first or second two-input AND gates, where when the timing signal enables said first AND gate, a first screen power signal is produced that causes said foreground screen to be placed in its clear mode at which time, said second AND gate is not enabled by said signal switching circuit therefore, said second screen remains in its normal translucent mode, which allows the conventional background image to be projected onto the translucent background screen and viewed through the clear foreground screen, and conversely, when said second AND gate is enabled by the second timing signal a second screen power signal is produced that causes said background screen to be placed in its clear mode while said foreground screen is returned to its translucent mode, which then allows the conventional foreground image to be projected through the clear background screen onto the translucent foreground screen, thus, by alternating the operational modes of each screen and allowing the separated foreground and background optical images to be alternately viewed, the viewer perceives a three-dimensional volumetric image that can be viewed without the need for any viewing implements.

16. The system as specified in claim 15 wherein said light responding circuit includes an infrared emitter.

17. The system as specified in claim 15 wherein said means for detecting said timing pulse is provided by an infrared detector.

18. The system as specified in claim 15 wherein said film projector includes means for alternately moving and synchronously projecting still slide transparencies.

19. The system as specified in claim 3 wherein said film is prepared by a computer enhancement technique that allows each existing optical image to be separated into at least two frames where the first frame depicts a conventional foreground image and a matted background image and conversely a second frame depicts a conventional background image and a matted foreground image.

20. The system as specified in claim 15 wherein the two projectors used on said system are synchronized so that when the first projector is projecting the first two-dimensional optical image, the second projector projects a matte frame and conversely when the second projector projects the second two-dimensional optical image, the first projector projects a matte frame.

21. The system as specified in claim 15 wherein said means for alternately projecting the first and second two-dimensional optical images utilizes a single projector that projects a film strip having alternating photographic frames where a first photographic frame depicts a first two-dimensional optical means consisting of a conventional foreground image and a matted background image and the following frame depicts a conventional background image and a matted foreground image.

22. The system as specified in claim 5 wherein said film strip is derived from a standard two-dimensional film strip that is modified by computer enhancement to produce a film strip suitable for use on said system.

23. The system as specified in claim 2 further comprising:

(a) a movable screen that operates in either a clear mode or a translucent mode where said screen is located between said foreground and background screen and is pivoted so that when one end moves towards the viewer the opposite end moves away from the viewer, (b) means for synchronizing the projected optical view with the selected operational mode of said movable screen, (c) means for synchronizing the focusing of the optical view with the moving distance of said movable screen.

24. The system as specified in claim 2 wherein said system further comprises at least three said screens where any one of said screens can be selected to be the background screen while the remaining screens situated towards the viewer are synchronously set to provide decreased or increased degrees of the foreground image.

25. The system as specified in claim 2 wherein said system is specificallly adaptled for viewing on a television system comprising:

(a) a television transmitter having the means for alternately transmitting said foreground and background images, and (b) a back projected television receiver having the means for receiving and projecting said foreground and background images transmitted from said television transmitter.

26. A method for producing an autostereoscopic system, comprising the steps of:

(a) create a film strip that includes;

(1) a first photographic frame consisting of a first two-dimensional optical image having a foreground that appears as a conventional image and a related background that appears as a matted image, (2) a second photographic frame consisting of a second two-dimensional optical image having the related background appearing as a conventional image and the foreground appearing as a matted image, (b) locate a stationary foreground screen nearest a viewer where said screen can be operated in either a clear mode or a translucent mode, (c) place a stationary background screen behind and in a planar separation from said foreground screen, where said background screen also can be operated in either a clear mode or a translucent mode, (d) place a projector behind said background screen, where said screen has means for back projecting said film strip onto said screen, (e) provide a means for selecting and controlling the operational modes of said foreground and background screens, where at any one film projection time period, only one of said screens is in its translucent mode while the other said screen is in its clear mode, and (f) provide a means for synchronizing the operational modes of said screens with the alternating projections of said first and second two-dimensional optical images where when said foreground screen is in its clear mode, the background image is synchronously projected onto the translucent said background screen and viewed through the clear foreground screen and conversely, when said background screen is in its clear mode, the foreground image is synchronously projected through the clear background screen and onto the translucent foreground screen thus, by alternating said separated optical images, the viewer is able to perceive a three-dimensional volumetric image without the need for a viewing implement.

* * * * *